Dec. 9, 1952 — A. KRELL — 2,620,911
LIMIT STOP
Filed June 27, 1950
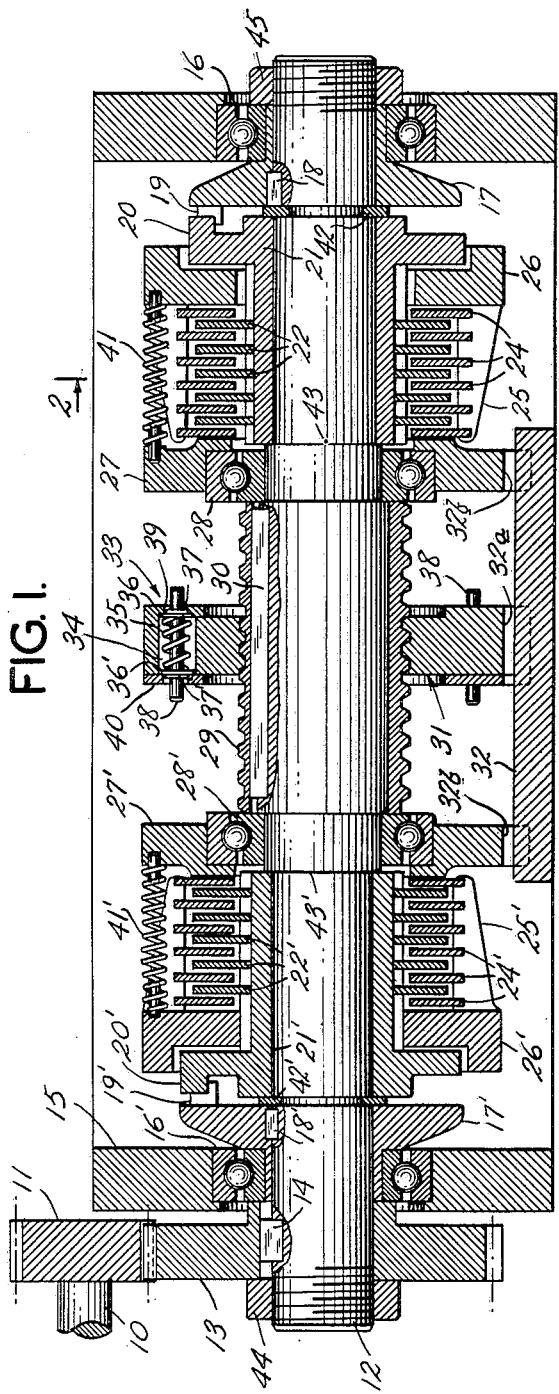
FIG. I.
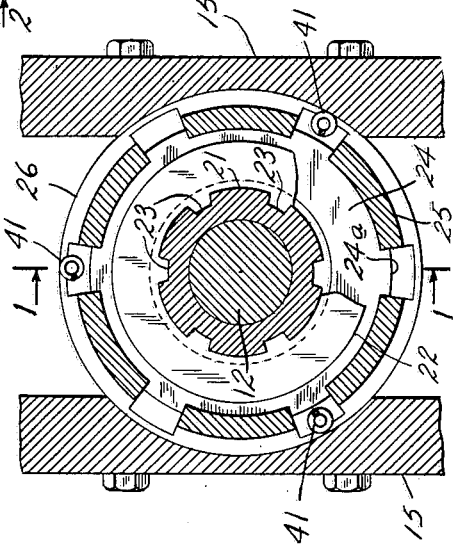
FIG. 2.
INVENTOR
ALFRED KRELL
BY
his ATTORNEYS.

Patented Dec. 9, 1952

2,620,911

UNITED STATES PATENT OFFICE 2,620,911

LIMIT STOP

Alfred Krell, Brooklyn, N. Y., assignor to Arma Corporation, Brooklyn, N. Y., a corporation of New York Application June 27, 1950, Serial No. 170,589

13 Claims. (Cl. 192—141)

This invention relates to limit stop mechanism, and has particular reference to the traveling nut type of stop mechanism for limiting the number of turns of a drive shaft in either direction.

Prior limit stop mechanisms of the traveling nut type required one braking device to stop the rotation of the drive shaft in one direction and a separate braking device to stop its rotation in the opposite direction and, when designed to stop the motion of high inertia loads, have become disproportionately large and heavy for the service they perform.

In accordance with the present invention, a traveling nut type of limit stop mechanism is provided in which only one breaking mechanism is required to stop the motion in both directions, even for high inertia loads, thereby reducing to a minimum the size of the limit stop required for any particular load.

In the preferred embodiment of the limit stop mechanism of this invention, the braking device, consisting of a plurality of rotating plates interlaminated with a plurality of stationary plates, is divided into two similar sections mounted at opposite ends of the stop drive shaft. The traveling nut is located between the two spaced sections of the braking device, and is mounted on a threaded sleeve which is splined to the central portion of the rotating drive shaft so as to rotate with the drive shaft and also to have freedom of longitudinal movement therealong. Accordingly, as one limit of rotation of the drive shaft is approached, the nut tends to compress one set of braking discs, and the reaction of the nut on the threaded sleeve displaces the sleeve longitudinally in the opposite direction to a position where the sleeve tends to cause compression of the other set of braking discs. Thereafter, further rotation of the drive shaft causes the nut to apply pressure to one set of braking discs while an equal pressure is applied to the opposite set of braking discs by the threaded sleeve, until the energy tending to continue to drive the shaft is absorbed by the braking discs and the drive shaft stops.

It will be seen that the limit stop mechanism of this invention is light and compact and, by its double acting operation, is capable of stopping large inertia loads within a few revolutions without shock or seizure, notwithstanding the small size of the mechanism compared to prior limit stop devices.

For a more complete understanding of the invention, reference may be had to the accompanying drawings in which:

Figure 1 is an axial section through the limit stop mechanism of this invention, as seen along the line 1—1 of Fig. 2; and Fig. 2 is a transverse section therethrough as seen along the line 2—2 of Fig. 1.

Referring now to Fig. 1, numeral 10 designates the shaft which is connected to a high inertia load, not shown, and whose rotational displacement is to be maintained within certain safe maximum and minimum values by the limit stop mechanism. Pinion 11 of shaft 10 meshes with drive gear 13 splined by key 14 to stop mechanism shaft 12, which is journalled on stationary frame 15 by antifriction bearings 16, 16', whose inner races are mounted on tubular axial extensions of similar drive members 17, 17' secured to shaft 12 with keys 18, 18'. Lock nuts 44 and 45 secure the respective drive members 17, 17' and the corresponding inner rows of bearings 16 and 16' on the opposite ends of shaft 12, as well as locking gear 13 endwise on shaft in the case of nut 44.

Collar 21 is axially located between a shoulder 43 on shaft 12 and a snap ring 42 inserted in a groove in shaft 12, while collar 21' is located between snap ring 42' and should 43'. The snap rings 42, 42' not only facilitate assembly but also afford the requisite freedom of rotation of shaft 12 within collars 21, 21', since the lock nuts 44, 45, when tightened on shaft 12, force the drive members 17, 17' against snap rings 42, 42' rather than against collars 21, 21'.

Lateral projections or dogs 19, 19' on the inside faces of drive members 17, 17' respectively cooperate with opposing lateral projections or dogs 20, 20' on the respective collars 21, 21' to drive the latter as shaft 12 rotates, these collars 21, 21' being free to rotate on shaft 12. The drive member 17 and cooperating collar 21 form a lost motion device in which shaft 12 turns through approximately one revolution before collar 21 begins to be driven by the engagement of the projection or dog 19 on drive member 17 with the projection or dog 20 or collar 21 to rotate the latter as the direction of rotation of shaft 12 is reversed, the purpose of which will be described. Cooperating drive member 17' and collar 21' also form a lost motion device at the other end of the mechanism.

Collar 21 carries a plurality of flat annular discs 22 having spaced projections 23 on the inner circumference (Fig. 2) which fit into longitudinal slots formed in the surface of collar 21, so that the discs 22 are rotated with collar 21 and are free to slide therealong. The discs 22 are interleaved between non-rotating annular discs 24 which are suspended within the projecting fingers 25 of the cage 26, which is suitably secured to frame 15. The discs 24 are provided with peripheral projections 24a, which slidably fit in the slots formed between fingers 25 of cage 26 so that discs 24 are prevented from rotating in cage 26 but are not rigidly secured thereto.

Preferably, the rotating discs 22 are formed entirely of steel while the non-rotating discs 24 are of steel faced with sintered bronze to afford dissimilar friction surfaces. Equivalent friction surfaces may be provided. On the opposite end of shaft 12 a similar assembly of interleaved rotating discs 22' and stationary discs 24' are carried on collar 21' and between fingers 25' of cage 26', respectively.

Slidably mounted on shaft 12 is the inner race of angular contact antifriction bearing 28 while the outer race of bearing 28 carries the compressing ring 27. Bearing 28 transmits thrust forces from its inner to its outer race as the inner race is urged to the right in Fig. 1. Interposed between compressing ring 27 and cage 26 are three similar springs 41, spaced circumferentially 120° apart, as shown in Fig. 2, which aid in releasing discs 22, 24 when pressure thereon is relieved. Similarly, lefthand compressing ring 27' is carried on angular contact bearing 28' which is slidably fitted on shaft 12 and transmits a leftwardly-directed force from the inner to the outer race and thence to the compressing ring 27', while springs 41' between ring 27' and cage 26' aid in releasing discs 22', 24'.

Located between the inner races of bearings 28 and 28', and splined to shaft 12 with key 30 is a right-hand threaded sleeve 29 which rotates with shaft 12 and which may move axially therealong. The nut 31 is threaded on sleeve 29 and is provided with an axial slot 32a in which is slidably fitted the track 32, rigid with frame 15, so that the nut is prevented from rotating as shaft 12 is rotated, but moves longitudinally along the threaded sleeve 29. Track 32 also fits in axial slots 32b in compressing rings 27, 27' to prevent any rotation thereof.

Arranged circularly about the opposite faces of nut 31 are a number of double acting plungers 33, of which only one is fully shown but all consist of a plunger rod 38 encircled by a spring 35 which is slightly compressed between washers 36, 36' and retaining rings 37, 37'. Each of the plungers 33 is held in a cavity 34 in nut 31 by shoulder 39 at one end, which bears against washer 36, and by plate 40 secured at the other end to nut 31 and bearing against washer 36'. The ends of plunger rod 38 and the retaining rings 37, 37' extend axially through openings in the nut 31 and the plate 40, respectively.

In operation of the limit stop mechanism of this invention, a clockwise rotation of shaft 10 as viewed from the end having pinion 11 causes shaft 12 and threaded sleeve 29 to be driven counterclockwise by engagement between projections or dogs 19 and 20, so that nut 31 moves leftward on sleeve 29. Assuming that the motor or other power source driving the equipment connected to shaft 10 is deenergized, and that the momentum of the system tends to continue driving shaft 10 beyond its prescribed safe limit of clockwise rotation, the nut 31 continues to move leftward and approaches compressing ring 27'. Near the limit of safe operation, plunger 38 engages compressing ring 27' and in turn urges it to the left. Simultaneously, the reaction of nut 31 on sleeve 29 urges it to the right and the sleeve 29, pressing on bearing 28, urges ring 27 to the right, so that both compressing ring 27 and ring 27' are simultaneously urged in opposite directions, i. e., respectively to the right and left. Consequently, the momentum which causes continued rotation of shaft 12 causes rings 27 and 27' to compress discs 24 against discs 22 and discs 24' against discs 22' to gradually brake and apply linearly loads to shaft 10, thereby absorbing by friction between the discs the energy tending to continue driving shaft 10, so that the rotation of shaft 10 is stopped.

In the condition where the motion of shaft 10 has been arrested by the stop mechanism in the manner just described, the discs 22 and 22' are effectively locked against discs 24 and 24', respectively, and collars 21, 21' cannot be rotated in either direction. Without the lost motion between shaft 12 and collars 21, 21' that is provided by drive members 17, 17', respectively, shaft 12 could not be driven out of this locked position. However, during the first retractive revolution of shaft 12, the projections or dogs 19, 19' of members 17, 17' are out of contact with projections or dogs 20, 20' of respective collars 21, 21', so that shaft 12 rotates freely within collars 21, 21'. During this initial revolution nut 31 travels sufficiently to release the pressure of discs 22, 22' on discs 24, 24', respectively, with the aid of springs 41, 41', thus allowing free rotation of collars 21, 21' and shaft 12 when the projections or dogs 19, 19' again contact respective projections or dogs 20, 20'. Lost motion of approximately two revolutions may be provided by interposing another dog between projections or dogs 19, 19' and 20, 20' if desired.

It will be understood that the spacing between the braking discs 22, 24 and 22', 24' is shown greatly exaggerated in Fig. 1 and that in actual practice only a minute motion of the compressing rings 27, 27' is required to bring the stationary discs 24 and 24' into frictional engagement with the rotating discs 22 and 22'. The pressure at which the discs are engaged depends on the resistance of springs 41, 41' and on the mechanical properties and the number of springs 35 as the plungers 38 bear against either ring 27 or ring 27', as the case may be. The springs 35 and 41, 41' and the number and size of discs 22, 22', 24, 24' are chosen with respect to the inertia load so that the expected maximum energy is absorbed by the stop mechanism during approximately one revolution after the initial contact of discs 22, 24 and 22', 24', i. e. during a displacement equal to the lost motion provided by driving members 17, 17' and the collars 21, 21', as has been explained. Springs 41 and 41' aid in separating discs 22, 24 and 22', 24' as the nut 31 is "backed off" from the corresponding compressing ring 27 or 27'.

Although a preferred embodiment of the invention has been illustrated and described herein, it is to be understood that the invention is not limited thereby, but is susceptible of changes in form and detail within the scope of the appended claims.

I claim:

1. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising relatively movable engaging portions respectively connected to said shaft and to said support, and respective operative connections between said nut and one of said braking means and between said sleeve and said other braking means for simultaneous braking of said shaft rotation by both of said braking means upon engagement of said nut with said one braking means.

2. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising relatively movable and fixed engaging portions respectively connected to said shaft and to said support, and respective operative connections between said nut and the movable portion of one of said braking means and between said sleeve and the movable portion of said other braking means for simultaneous braking of said shaft rotation by both of said braking means upon engagement of said nut with the movable portion of said one braking means.

3. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising axially movable and fixed engaging portions respectively connected to said shaft and to said support, and respective operative connections between said nut and the movable portion of one of said braking means and between said sleeve and the movable portion of said other braking means for simultaneous braking of said shaft rotation by both of said braking means upon engagement of said nut with the movable portion of said one braking means.

4. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising interleaved axially movable friction discs alternately connected to said shaft and to said support, and respective operative connections between said nut and one of said braking means and between said sleeve and said other braking means for simultaneous braking of said shaft rotation by both of said braking means upon engagement of said nut with said one braking means.

5. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising interleaved axially movable friction discs alternately connected to said shaft and to said support, a compression plate interposed between each braking means and said nut, and respective operative connections between said nut and one of said compression plates and between said sleeve and said other compression plate for simultaneous braking of said shaft rotation by both of said braking means upon engagement of said nut with said one compression plate.

6. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising relatively movable engaging portions respectively connected to said shaft and to said support, lost motion means interposed between said shaft and the shaft-connected portion of each braking means, and respective operative connections between said nut and one of said braking means and between said sleeve and said other braking means for simultaneous braking of said shaft rotation by both of said braking means upon engagement of said nut with said one braking means.

7. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at at least one end of said sleeve comprising relatively movable and fixed engaging portions respectively connected to said shaft and to said support, an abutment at the other end of said sleeve, and operative connections between said nut and the movable portion of said braking means and between said other end of said sleeve and said abutment for causing the relatively movable and fixed engaging portions of said braking means to engage and brake the rotation of said shaft.

8. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising axially movable and fixed engaging portions respectively connected to said shaft and to said support, a collar journalled on said shaft and carrying said axially movable portion of each braking means, and respective operative connections between said nut and the movable portion of one of said braking means and between said sleeve and the movable portion of said other braking means for simultaneous braking of said shaft rotation by both of said braking means upon engagement of said nut with the movable portion of said one braking means.

9. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising relatively movable engaging portions respectively connected to said shaft and to said support, respective operative connections between said nut and one of said braking means and between said sleeve and said other braking means for simultaneous braking of said shaft rotation by both of said braking means upon engagement of said nut with said one braking means, and cushioning means interposed in said connections between said nut and said one braking means.

10. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising interleaved axially movable friction discs alternately connected to said shaft and to said support, a compression plate interposed between each braking means and said nut, respective operative connections between said nut and one of said compression plates and between said sleeve and said other compression plate for simultaneous braking of said shaft rotation by both of said braking means upon engagement of said nut with said one compression plate, and spring means between said support and each compression plate for normally urging the interleaved friction discs of the corresponding braking means toward disengaged position.

11. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising interleaved axially movable friction discs alternately connected to said shaft and to said support, a compression plate interposed between each braking means and said nut, respective operative connections between said nut and one of said compression plates and between said sleeve and said other compression plate for simultaneous braking of said shaft rotation by both of said braking means upon engagement of said nut with said one compression plate, cushioning means interposed in said connections between said nut and said one compression plate, and spring means between said support and each compression plate for normally urging the interleaved friction discs of the corresponding braking means toward disengaged position.

12. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising relatively movable engaging portions respectively connected to said shaft and to said support, a dog on said shaft, a cooperating dog on the corresponding shaft-connected portion of each braking means adapted to be engaged by said shaft dog for rotation of said last-named portion by said shaft, and respective operative connections between said nut and one of said braking means and between said sleeve and said other braking means for simultaneous braking of said shaft rotation by both of said braking means upon engagement of said nut with said one braking means.

13. In limit stop mechanism for a rotating shaft journalled in a support, the combination of a threaded sleeve splined on said shaft for rotation therewith and axial movement therealong, a nut on said sleeve, spline means connected to said support and said nut for precluding rotation of said nut and affording axial movement thereof along said sleeve, braking means at each end of said sleeve each comprising interleaved axially movable friction discs alternately connected to said shaft and to said support, a compression plate interposed between each braking means and said nut, a dog on said shaft, a dog on the corresponding shaft-connected portion of each braking means adapted to be engaged by said shaft dog for rotation of said last-named portion by said shaft, respective operative connections between said nut and one of said compression plates and between said sleeve and said other compression plate for simultaneous braking of said shaft rotation by both of said braking means upon engagement of said nut with said one compression plate, and spring means between said support and each compression plate for normally urging the interleaved friction discs of the corresponding braking means toward disengaged position.

ALFRED KRELL.

REFERENCES CITED

The following references are of record in the file of this patent:

UNITED STATES PATENTS

| Number | Name | Date |
|---|---|---|
| 1,216,168 | Riefstahl | Feb. 13, 1917 |
| 2,016,359 | Corbin, Jr. | Oct. 8, 1935 |
| 2,045,593 | Frankland | June 30, 1936 |